United States Patent
Siour et al.

(10) Patent No.: US 6,177,162 B1
(45) Date of Patent: *Jan. 23, 2001

(54) POLYAMIDE-BASED PIPES FOR CONVEYING PETROL

(75) Inventors: Daniel Siour, Sartrouville; Olivier Denizart, Millery; Bruno Echalier, Paris, all of (FR)

(73) Assignee: Atofina (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/596,905

(22) Filed: Mar. 11, 1996

(30) Foreign Application Priority Data

Mar. 9, 1995 (FR) .................................................. 95 02751

(51) Int. Cl.[7] .................................................. B29D 23/00
(52) U.S. Cl. .................. 428/36.91; 428/36.9; 428/36.92; 138/137; 138/140; 138/141
(58) Field of Search ............................... 428/36.9, 36.91, 428/36.92; 138/137, 140, 141

(56) References Cited

U.S. PATENT DOCUMENTS

| 3,972,961 | 8/1976 | Hammer et al. ..................... 260/857 |
| 3,976,720 | 8/1976 | Hammer et al. ..................... 260/857 |
| 5,038,833 | * 8/1991 | Brunnhofer ........................ 138/137 |
| 5,070,145 | 12/1991 | Guerdoux ............................ 525/179 |
| 5,271,977 | * 12/1993 | Yoshikawa et al. ................ 428/35.9 |
| 5,342,886 | 8/1994 | Glotin et al. ......................... 525/66 |
| 5,362,530 | 11/1994 | Kitami et al. ...................... 428/36.2 |
| 5,560,398 | 10/1996 | Pfleger ................................ 138/121 |
| 5,708,088 | 1/1998 | Hert et al. .......................... 525/183 |

FOREIGN PATENT DOCUMENTS

| C-4 202 399 | 2/1993 | (DE) . |
| 0 342 066 | 11/1989 | (EP) . |
| 0 564 338 | 10/1993 | (EP) . |
| 2 291 225 | 7/1976 | (FR) . |
| 2 204 376 | 11/1988 | (GB) . |
| 2 204 932 | 11/1988 | (GB) . |
| WO-A-94 29626 | 12/1994 | (WO) . |

* cited by examiner

Primary Examiner—S. Mark Clardy
Assistant Examiner—Michael A. Williamson
(74) Attorney, Agent, or Firm—Pennie & Edmonds LLP

(57) ABSTRACT

The invention relates to a pipe with an internal layer, which includes a mixture of polyamide and of polyolefin with a polyamide matrix, an external layer, which includes a polyamide, and optionally an EVOH layer between the said external and internal layers. These pipes are particularly impervious to alcohol-containing petrols.

20 Claims, No Drawings

POLYAMIDE-BASED PIPES FOR CONVEYING PETROL

BACKGROUND

The present invention relates to polyamide-based pipes for conveying petrol and more particularly to pipes for delivering petrol from the petrol tank of a motor vehicle to the engine, and to pipes for conveying hydrocarbons in service stations.

For safety and environmental protection reasons motor vehicle manufacturers impose mechanical characteristics on petrol pipes: strength and flexibility, and characteristics of increased resistance to permeability. The pipes must be as impervious as possible to petroleum products and to their additives, in particular methanol or ethanol.

Polyamides exhibit all these properties; but, to exhibit good low-temperature mechanical properties, polyamides must be plasticizer. However, plasticizer polyamides are less impervious to hydrocarbons than unplasticized polyamides, above all lead-free petrols.

Applicants have now found a polyamide-based pipe which has very low permeability to petrol and which has very good mechanical properties.

The present invention relates to a pipe with an internal layer, which includes a mixture of polyamide and polyolefin with a polyamide matrix, and an external layer, which includes a polyamide.

The polyamide matrix of the internal layer may include any polyamide. Polyamide is intended to mean the products of condensation of the following:
- one or more amino acids such as aminocaproic, 7-aminoheptanoic, 11-aminoundecanoic and 12-aminododecanoic acids or of one or more lactams such as caprolactam, oenantholactam and lauryllactam;
- one or more salts or mixtures of diamines such as hexamethylenediamine, dodecamethylenediamine, meta-xylylenediamine, bis-p-aminocyclohexylmethane and trimethylhexamethylenediamine with diacids such as isophthalic, terephthalic, adipic, azelaic, suberic, sebacic and dodecanedicarboxylic acids;
- or mixtures of all these monomers, which produces copolyamides.

Polyamide mixtures may be employed. PA-6 and PA-6,6 and PA 12 may be advantageously employed.

Polyolefins are intended to mean polymers including olefin units such as, for example, ethylene, propylene, 1-butene units and the like. The following may be mentioned by way of example of polyolefins:
- polyethylene, polypropylene and copolymers of ethylene with alpha-olefins. These products may be grafted with anhydrides of unsaturated carboxylic acids such as maleic anhydride or unsaturated epoxides such as glycidyl methacrylate;
- copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their half-esters and their anhydrides and (iv) unsaturated epoxides.

These ethylene copolymers may be grafted with anhydrides of unsaturated dicarboxylic acids or unsaturated epoxides.
- optionally maleinized styrene/ethylene-butene/styrene (SEBS) block copolymers.

Mixtures of two or more of these polyolefins may be employed.

Those advantageously employed are:
- polyethylene,
- copolymers of ethylene and of an alpha-olefin,
- copolymers of ethylene/of an alkyl (meth)acrylate,
- copolymers of ethylene/of an alkyl (meth)acrylate/of maleic anhydride, the maleic anhydride being grafted or copolymerized,
- copolymers of ethylene/of an alkyl (meth)acrylate/of glycidyl methacrylate, the glycidyl methacrylate being grafted or copolymerized,
- polypropylene.

It is recommended to add a compatibilizing agent to facilitate the formation of the polyamide matrix and if the polyolefins have few or no functional groups that can facilitate compatibilization.

The compatibilizing agent is a product that is known per se for compatibilizing polyamides and polyolefins.

The following may be mentioned, for example:
- polyethylene, polypropylene, ethylene propylene copolymers and ethylene-butene copolymers, all these products being grafted with maleic anhydride or glycidyl methacrylate,
- ethylene/alkyl (meth)acrylate/maleic anhydride copolymers, the maleic anhydride being grafted or copolymerized,
- ethylene/vinyl acetate/maleic anhydride copolymers, the maleic anhydride being grafted or copolymerized,
- the above two copolymers in which the maleic anhydride is replaced with glycidyl methacrylate,
- ethylene/(meth)acrylic acid copolymers, optionally their salts,
- polyethylene, polypropylene or ethylene propylene copolymers, these polymers being grafted with a product exhibiting a site which is reactive with amines; these graft copolymers being subsequently condensed with polyamides or polyamide oligomers which have only one amine end.

These products are described in patents FR 2 291 225 and EP 342 066, the content of which is incorporated into the present application.

The quantity of polyamide forming the matrix in the internal layer may be between 50 and 95 parts per 5 to 50 parts of polyolefins.

The quantity of compatibilizing agent is the quantity which is sufficient for the polyolefin to be dispersed in the form of nodules in the polyamide matrix. It may represent up to 20% by weight of the polyolefin. These polymers of the internal layer are manufactured by mixing polyamide, polyolefin and optionally compatibilizing agent according to the usual techniques for mixing in the molten state (twin-screw, Buss, single-screw).

The internal layer advantageously includes a matrix of polyamide 6 (PA-6) or 66 (PA-6,6) in which are dispersed either nodules of a mixture of low-density polyethylene and of a copolymer of ethylene of alkyl (meth)acrylate and of maleic anhydride or of glycidyl methacrylate, or nodules of polypropylene.

Such products are described in Patents U.S. Pat. No. 5,070,145 and EP 564 338.

In the case of polypropylene, a compatibilizing agent is added. For example, one may use an ethylene/propylene copolymer with a predominating number of propylene units, grafted with maleic anhydride and then subsequently condensed with monoamine caprolactam oligomers.

These mixtures of polyamide and of polyolefin of the internal layer may be plasticizer and may optionally contain fillers such as carbon black and the like.

Such mixtures of polyamide and of polyolefin are described in U.S. Pat. No. 5,342,886.

According to a preferred form of the invention the quantity of polyamide in the internal layer is between 50 and 75 parts per 100 parts of the polyamide/polyolefin mixture.

For example, the following mixtures (in weight %) may be employed:

1) 55 to 70% of PA-6, 5 to 15% of an ethylene propylene copolymer containing predominantly polypropylene grafted with maleic anhydride and then subsequently condensed with monoamine caprolactam oligomers, the remainder to 100% made of polypropylene;

2) 55 to 70% of PA-6, 5 to 15% of at least one copolymer of ethylene with (i) an alkyl (meth)acrylate or a vinyl eater of an unsaturated carboxylic acid and (ii) an anhydride of an unsaturated carboxylic acid or a grafted or copolymerized unsaturated epoxide, the remainder made of polyethylene.

The polyamide of the external layer may be chosen from the polyamides referred to above in the case of the internal layer. Polyamide 11 or polyamide 12 is advantageously employed. The polyamide of the external layer is advantageously plasticized.

It is possible to employ the usual plasticizers such as butylbenzenesulphonamide (BBSA) and polymers including polyamide blocks and polyether blocks. These block polymers result from the condensation of polyamide blocks with carboxylic ends either with polyetherdiols or with polyetherdiamines or a mixture of these polyethers. This external layer may also contain antioxidant additives and conventional fillers such as carbon black.

It is desirable that the internal layer should be efficiently bonded to the external layer. A pipe which does not exhibit bonding between the two layers cannot be easily folded or bent by hot forming; in this case the thinnest material forms creases during the operation.

Furthermore, if the two layers do not adhere to each other sufficiently, possible condensation of vapour between the two layers may, in the course of time, result in distortion of the thinnest part of the pipe. In addition, since the pipes are connected to each other, as well as to the petrol tank and to the carburetor, by means of couplings, the couplings cannot ensure a leakproof fit if they bear on two separated layers. Finally, in the case where the thickness of the internal layer is very small, and without adhesion, a partial vacuum in the pipe distorts the internal layer irreversibly, making the pipe unusable.

The pipes of the invention may be produced by coextrusion. If the internal layer does not adhere sufficiently to the external layer, a coextrusion binder may be placed between them. Examples of binder are:

polyethylene, polypropylene, copolymers of ethylene and of at least one alpha-olefin and mixtures of these polymers, all these polymers being grafted with anhydrides of unsaturated carboxylic acids such as, for example, maleic anhydride. It is also possible to employ mixtures of these graft polymers and of these ungrafted polymers;

copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their half-esters and their anhydrides and (iv) unsaturated epoxides. It is possible for these copolymers to be grafted with anhydrides of unsaturated dicarboxylic acids, such as maleic anhydride, or unsaturated epoxides such as glycidyl methacrylate.

It is also possible to add to one or to each of the layers a product which improves their adhesion without having to employ a layer of binder. This product may be the binder described above.

It would not constitute a departure from the scope of the invention to place other layers between the internal layer and the external layer. In other words, instead of having internal layer/external layer, it would be possible to have internal layer/intermediate layer or layers/external layer. It also may be necessary to place a layer of binder between the external layer and an intermediate layer if the bonding between them is insufficient, as was explained above in the case of the binder layer. Similarly, a layer of binder may be placed between the internal layer and an intermediate layer and between intermediate layers. The intermediate layers may consist of a mixture of polymers originating from pipes of the invention exhibiting defects and having to be recycled.

According to another form of the invention, a layer of a polymer including ethylene units and vinyl alcohol units (EVOH) may be placed between the internal and external layers. As explained above, a binder also may employed.

The following structure is advantageously employed:

internal layer/EVOH/binder/external layer.

With regard to pipes for conveying petrol from the motor vehicle tank to the engine, their external diameter ranges from around 6 to 12 mm and their thickness ranges from around 0.8 to 2 mm. The internal layer is at least around 50 $\mu$m and ranges preferably from around 100 to 500 $\mu$m.

The optional layer of binder is at least 10 $\mu$m and ranges preferably from around 20 to 100 $\mu$m.

The external layer is at least around 300 $\mu$m and ranges preferably from around 400 to 800 $\mu$m. The optional EVOH layer may range from around 10 to 40 $\mu$m.

These pipes may be sheathed with rubber to protect them from engine hot spots.

As for the pipes employed in service stations, the external diameter ranges generally from around 20 to 120 mm and their thickness ranges from around 0.8 to 14 mm. The thickness of binder and of the internal layer are the same as those indicated above. The pipes may be reinforced by any conventional method.

EXAMPLES

A pipe of 8 mm external diameter and 1 mm in thickness was manufactured by coextrusion.

The external layer, 520 $\mu$m in thickness, consisted of PA-11 (with a viscosity of 1.4 dl/g, measured at 25° C. on a solution of 0.5 g in 100 g of meta-cresol), containing 13% by weight of BBSA and filled with carbon black.

The binder, 80 $\mu$m in thickness, was a mixture of two ethylene copolymers, one with butene, the other with propylene, which were grafted with maleic anhydride, of melt index 1, containing 0.4% by weight of anhydride.

The internal layer, of 400 $\mu$m thickness, was a mixture of:

65 parts of PA-6, forming a matrix;

30 parts of an ethylene/butene copolymer of melt index 0.8 g/10 min; and 5 parts of an ethylene/ethyl acrylate/maleic anhydride copolymer containing 5% by weight of acrylate and 3% by weight of anhydride, and of melt index 5.

Mechanical properties a) Cold impact

Impact at −40° C. according to standards DIN 73378, SAE J 844 and GM 213 M.

|  | DIN 73378 | SAE 5844 | G.M. 213 M |
| --- | --- | --- | --- |
| Impact at −40° C. | no break | no break | no break |

Under the same test conditions, a single-layer pipe of identical dimensions, made entirely of the mixture of the internal layer, exhibited 10 breaks out of 10.

b) Elongation in fuel

A pipe made entirely from the mixture of the internal layer lengthened by 5.2% during a fuel circulation test.

During the same test, the three-layer pipe, according to the invention, lengthened by only 2%.

Permeability

Permeability measurements with a fuel containing 10% of ethanol (reference TF 1) at a temperature of 40° C. yielded the following results on 8×1 mm pipes.

Single-layer pipe made entirely from the polymer of the external layer of the invention. Permeability: 135 g/m$^2$/day Three-layer pipe according to the invention Permeability: 43 g/m$^2$/day Single-layer pipe made of polyamide which is identical with that of the external layer (PA-11) but without the plasticizer. Permeability: 33 g/m$^2$/day A permeability which is equivalent to an unplasticized single layer (PA-11) is thus obtained while retaining good flexibility by virtue of the outer layer of plasticizer polyamide and the barrier effect of the PA/polyolefin blend.

What is claimed:

1. A pipe comprising an internal layer and an external layer, wherein the internal layer comprises a polyamide matrix in which are dispersed nodules of a mixture of a polyolefin and a compatibilizing agent which is elected from the group consisting of polyethylene, polypropylene, ethylene propylene copolymers and ethylene-butene copolymers, grafted with maleic anhydride or glycidyl methacrylate ethylene/alkyl (meth)acrylate/maleic anhydride copolymers, the maleic anhydride being grafted or copolymerized, ethylene/vinyl acetate/maleic anhydride copolymers, the maleic anhydride being grafted or copolymerized, ethylene/alkyl (meth)acrylate/glycidyl anhydride copolymers, the glycidyl anhydride being grafted or copolymerized, ethylene/vinyl acetate/glycidyl anhydride copolymers, the glycidyl anhydride being grafted or copolymerized, ethylene/(meth)acrylic acid copolymers and their salts, polyethylene, polypropylene or ethylene propylene copolymers, these polymers being grafted with a product exhibiting a site which is reactive with amines; these graft copolymers being subsequently condensed with polyamides or polyamide oligomers which have only one amine end and wherein the external layer comprises a polyamide.

2. The pipe according to claim 1, in which the matrix of the internal layer is made of polyamide 6, polyamide 6,6 or polyamide 12.

3. The pipe according to claim 1, in which the polyolefin of the internal layer is either polypropylene or a mixture of an ethylene/alpha-olefin copolymer and of an ethylene/alkyl (meth)acrylate/maleic anhydride or glycidyl methacrylate copolymer.

4. The pipe according to one of claim 1, in which the polyamide of the external layer is PA-11 or PA-12.

5. The pipe according to one of claim 1, in which a layer of binder is placed between the internal layer and the external layer.

6. The pipe according to claim 5, which has an external diameter of between 6 and 12 mm, a thickness of between 0.8 and 2 mm, an internal layer of at least 50 μm, a layer of binder of at least 10 μm and an external layer of at least 300 μm.

7. The pipe according to one of claim 1, in which an EVOH layer is placed between the internal layer and the external layer.

8. The pipe according to claim 2, in which the polyolefin of the internal layer is either polypropylene or a mixture of an ethylene/alpha-olefin copolymer and of an ethylene/alkyl (meth)acrylate/maleic anhydride or glycidyl methacrylate copolymer.

9. The pipe according to claim 2, in which the polyamide of the external layer is PA-11 or PA-12.

10. The pipe according to claim 3, in which the polyamide of the external layer is PA-11 or PA-12.

11. The pipe according to claim 2, in which a layer of binder is placed between the internal layer and the external layer.

12. The pipe according to claim 3, in which a layer of binder is placed between the internal layer and the external layer.

13. The pipe according to claim 4, in which a layer of binder is placed between the internal layer and the external layer.

14. The pipe according to claim 2, in which an EVOH layer is placed between the internal layer and the external layer.

15. The pipe according to claim 3, in which an EVOH layer is placed between the internal layer and the external layer.

16. The pipe according to claim 4, in which an EVOH layer is placed between the internal layer and the external layer.

17. The pipe according to claim 5, in which an EVOH layer is placed between the internal layer and the external layer.

18. The pipe according to claim 6, in which an EVOH layer is placed between the internal layer and the external layer.

19. A pipe of claim 1 wherein the polyamide is PA-6, the polyolefin is polypropylene, and the compatibilizing agent is an ethylene propylene copolymer containing predominantly polypropylene grafted with maleic anhydride and then subsequently condensed with monoamine caprolactam oligomers.

20. The pipe of claim 1 wherein the polyamide is PA-6, the polyolefin is polyethylene, and the compatibilizing agent is at least one copolymer of ethylene with (i) an alkyl (meth)acrylate or a vinyl eater of an unsaturated carboxylic acid and (ii) an anhydride of an unsaturated carboxylic acid or a grafted or copolymerized unsaturated epoxide.

* * * * *